United States Patent
Cradick et al.

(10) Patent No.: US 8,131,740 B2
(45) Date of Patent: Mar. 6, 2012

(54) USER-SPECIFIC SEARCH INDEXING WITHIN A VIRTUAL ENVIRONMENT

(75) Inventors: Ryan Kirk Cradick, Rochester, MN (US); Zachary Adam Garbow, Rochester, MN (US); Ryan Robert Pendergast, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 11/869,329

(22) Filed: Oct. 9, 2007

(65) Prior Publication Data

US 2009/0094225 A1    Apr. 9, 2009

(51) Int. Cl.
*G06F 17/30* (2006.01)

(52) U.S. Cl. ......................... 707/758; 707/759; 707/760

(58) Field of Classification Search .................. 707/758, 707/999.4, E17.111, 759, 769, 770
See application file for complete search history.

(56) References Cited

U.S. PATENT DOCUMENTS

| | | | | |
|---|---|---|---|---|
| 5,442,780 | A * | 8/1995 | Takanashi et al. | 1/1 |
| 5,737,533 | A * | 4/1998 | de Hond | 709/219 |
| 6,199,059 | B1 * | 3/2001 | Dahan et al. | 1/1 |
| 6,694,306 | B1 * | 2/2004 | Nishizawa et al. | 707/714 |
| 7,251,622 | B2 * | 7/2007 | Yan et al. | 705/28 |
| 7,792,808 | B2 * | 9/2010 | Stuart et al. | 707/705 |
| 2002/0105533 | A1 * | 8/2002 | Cristo | 345/706 |
| 2003/0135433 | A1 * | 7/2003 | Yan et al. | 705/28 |
| 2003/0164827 | A1 * | 9/2003 | Gottesman et al. | 345/419 |
| 2004/0167880 | A1 * | 8/2004 | Smith | 707/3 |
| 2005/0021472 | A1 * | 1/2005 | Gettman et al. | 705/52 |
| 2005/0251512 | A1 * | 11/2005 | McCauley et al. | 707/3 |
| 2007/0214117 | A1 * | 9/2007 | Shu | 707/3 |
| 2007/0218987 | A1 * | 9/2007 | Van Luchene et al. | 463/30 |
| 2007/0226176 | A1 * | 9/2007 | Bestgen et al. | 707/2 |
| 2007/0233839 | A1 * | 10/2007 | Gaos | 709/223 |
| 2007/0255677 | A1 * | 11/2007 | Alexander et al. | 707/1 |
| 2008/0097891 | A1 * | 4/2008 | Park | 705/37 |
| 2008/0215540 | A1 * | 9/2008 | Bestgen et al. | 707/2 |
| 2008/0222104 | A1 | 9/2008 | Stewart et al. | |
| 2009/0099925 | A1 * | 4/2009 | Mehta et al. | 705/14 |

OTHER PUBLICATIONS

U.S. Patent Application entitled, "Generating a User-Specific Search Index of Content Within a Virtual Environment," filed Oct. 10, 2007, U.S. Appl. No. 11/869,816.

Peter Jorissen et al., "Dynamic Interactions in Physically Realistic Collaborative Virtual Environments," 2005, IEEE Transactions on Visualization and Computer Graphics, vol. 11, No. 6, published by IEEE Computer Society, pp. 649-660.

* cited by examiner

*Primary Examiner* — Frantz Coby

(74) *Attorney, Agent, or Firm* — Patterson & Sheridan LLP

(57) ABSTRACT

Embodiments of the invention provide techniques for searching for virtual objects of an immersive virtual environment based on user interactions within the virtual environment. Generally, embodiments provide an attribute index storing data describing attributes of virtual objects, and an interaction index storing data describing user interactions with virtual objects. Search queries may be evaluated using both the attribute index and interactions index. Thus, virtual objects may be searched in terms of object attributes as well as user interactions with the virtual objects.

25 Claims, 4 Drawing Sheets

USER-SPECIFIC SEARCH INDEXING WITHIN A VIRTUAL ENVIRONMENT

BACKGROUND OF THE INVENTION

1. Field of the Invention

Embodiments of the invention relates to presenting users with an immersive virtual environment. More specifically, embodiments of the invention may allow users to perform searches of objects in an immersive virtual environment.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication. Communication may be in the form of text messages sent between avatars, but may also include real-time voice communication.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plot and events continue to occur as users enter (and exit) the virtual world.

SUMMARY OF THE INVENTION

The present invention generally provides a method, apparatus, and articles of manufacture for searching virtual objects of an immersive virtual environment based on user interactions within the virtual environment.

One embodiment of the invention includes a computer-implemented method for responding to a search request for content elements present in an immersive virtual environment. The method may generally include receiving a search query. The search query may include one or more attribute conditions identifying characteristics of at least one content element of the virtual environment. The search query may also include at least one interaction condition describing a user's past interactions with content elements of the virtual environment. The method may also include determining a collection of content elements present in the virtual environment satisfying the one or more attribute conditions of the search query, filtering the collection of content elements, based on the one or more interaction conditions, and returning the set of search results to the user.

Another embodiment of the invention includes a computer-readable storage medium including a program, which when executed on a processor performs an operation for responding to a search request for content elements present in an immersive virtual environment. The operation may generally include receiving a search query. The search query may include one or more attribute conditions identifying characteristics of at least one content element of the virtual environment. The search query may also include at least one interaction condition describing a user's past interactions with content elements of the virtual environment. The operation may also include determining a collection of content elements present in the virtual environment satisfying the one or more attribute conditions of the search query, filtering the collection of content elements, based on the one or more interaction conditions, and returning the set of search results to the user.

Still another embodiment of the invention includes a system, comprising a processor; and a memory containing a program, which when executed by the processor is configured to respond to a search request for content elements present in an immersive virtual environment. The program may be configured to receive a search query. The search query may include one or more attribute conditions identifying characteristics of at least one content element of the virtual environment. The search query may also include at least one interaction condition describing a user's past interactions with content elements of the virtual environment. The program may be further configured to determine a collection of content elements present in the virtual environment satisfying the one or more attribute conditions of the search query, filter the collection of content elements, based on the one or more interaction conditions, and return the set of search results to the user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
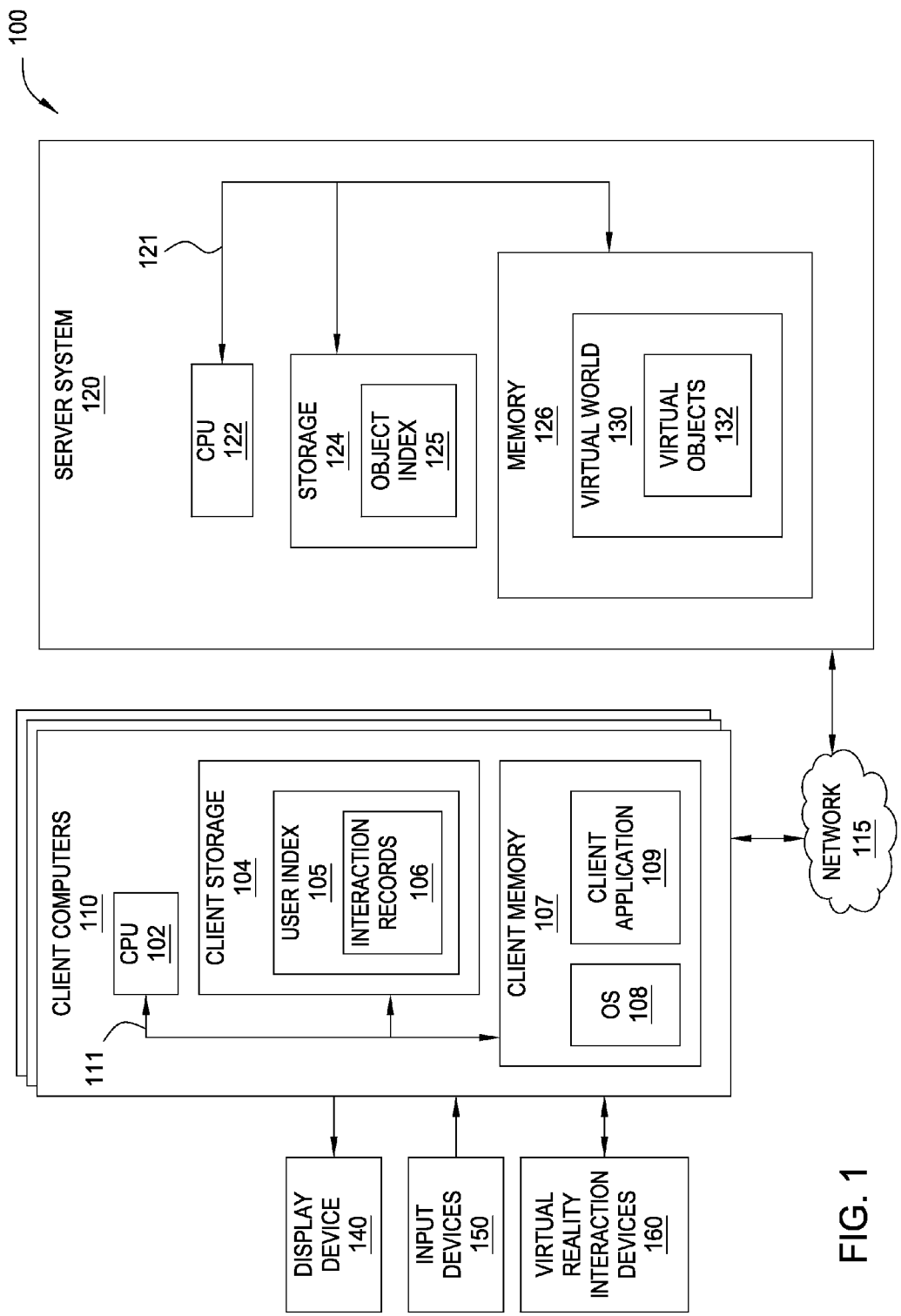
FIG. 1 is a block diagram that illustrates a client server view of computing environment configured for searching virtual objects, according to one embodiment of the invention.

A virtual world is a simulated environment in which users may inhabit and interact with one another via avatars. While in a virtual world, users may also interact with elements of the virtual world. However, searching for items or places within a virtual world is quite different from typical web or desktop searching. This occurs due to several factors. For example, virtual worlds present a constantly changing environment—a virtual store a user visited weeks ago may be something different today. Further, each person in a virtual world may see objects from their own perspective or location, and the environment in which an object is located can distinguish it from the same object in a different location. Similarly, time spent actively interacting with an object, i.e., the amount of time a user interacts with an object may be used to suggest the importance of finding the object at a later time. Given these factors, a central search index cannot account for every object and all the unique interactions with that object for each person in the virtual world.

For example, a user searching for a virtual object may compose a search query, meaning a query including keywords describing the desired object. For example, a user may compose a search query including an object name, color, and size (e.g., "find large red box"). Generally, keywords included in a query may be matched to objects by using a search index storing descriptive attributes of a virtual object. However, this approach is not usually suitable for evaluating a search query composed in terms of the user's previous interactions with an object (e.g., "find box I opened on Monday"). This is because such search indexes only relate to attributes of the virtual objects, and do not include data describing a given user's interaction with the virtual objects.

Embodiments of the invention provide techniques for searching for virtual objects of an immersive virtual environment based on user interactions within the virtual environment. Generally, embodiments provide an attribute index storing data describing attributes of virtual objects, and an interaction index storing data describing user interactions with virtual objects. Search queries may be evaluated using both the attribute index and interactions index. Thus, virtual objects may be searched in terms of object attributes as well as user interactions with the virtual objects. Optionally, the relevance of the virtual objects to the user may be assessed using the interaction index.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, server system 120 includes a CPU 122, which obtains instructions and data via a bus 121 from memory 126 and storage 124. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 124 may be considered to include memory physically located elsewhere in a server 120, for example, on another computer coupled to the server 120 via bus 121. Server 120 may be operably connected to the network 115, which generally represents any kind of data communications network. Accordingly, the network 115 may represent both local and wide area networks, including the Internet.

As shown, memory 126 includes virtual world 130. In one embodiment, virtual world 130 may be a software application that allows a user to explore and interact with an immersive environment. Illustratively, virtual world 130 includes virtual objects 132. Virtual objects 132 represent a collection of searchable content elements present within the immersive environment provided by virtual world 130. Storage 124 includes an object index 125. In one embodiment, object index 125 may store data describing characteristics of virtual objects 132 included in virtual world 130, and may be configured for use in performing searches of virtual objects 132. Such characteristics of virtual objects 132 may include, e.g., the name of the object's owner/creator, when the object was created, the object's cost, type, dimensions, color, shape, location, attributes, etc. The use of object index 125 in performing searches is discussed below with reference to client application 109.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115.

Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, client application 109 provides a software program that allows a user to connect to a virtual world 130, and once connected, to explore and interact with virtual world 130. Further, client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to virtual world 130 on server 120. Such a display may include content from the virtual world determined from the user's line of sight at any given time. For the user, the display may include the avatar of that user or may be a camera eye where the user sees the virtual world through the eyes of the avatar representing this user.

Figure 2:
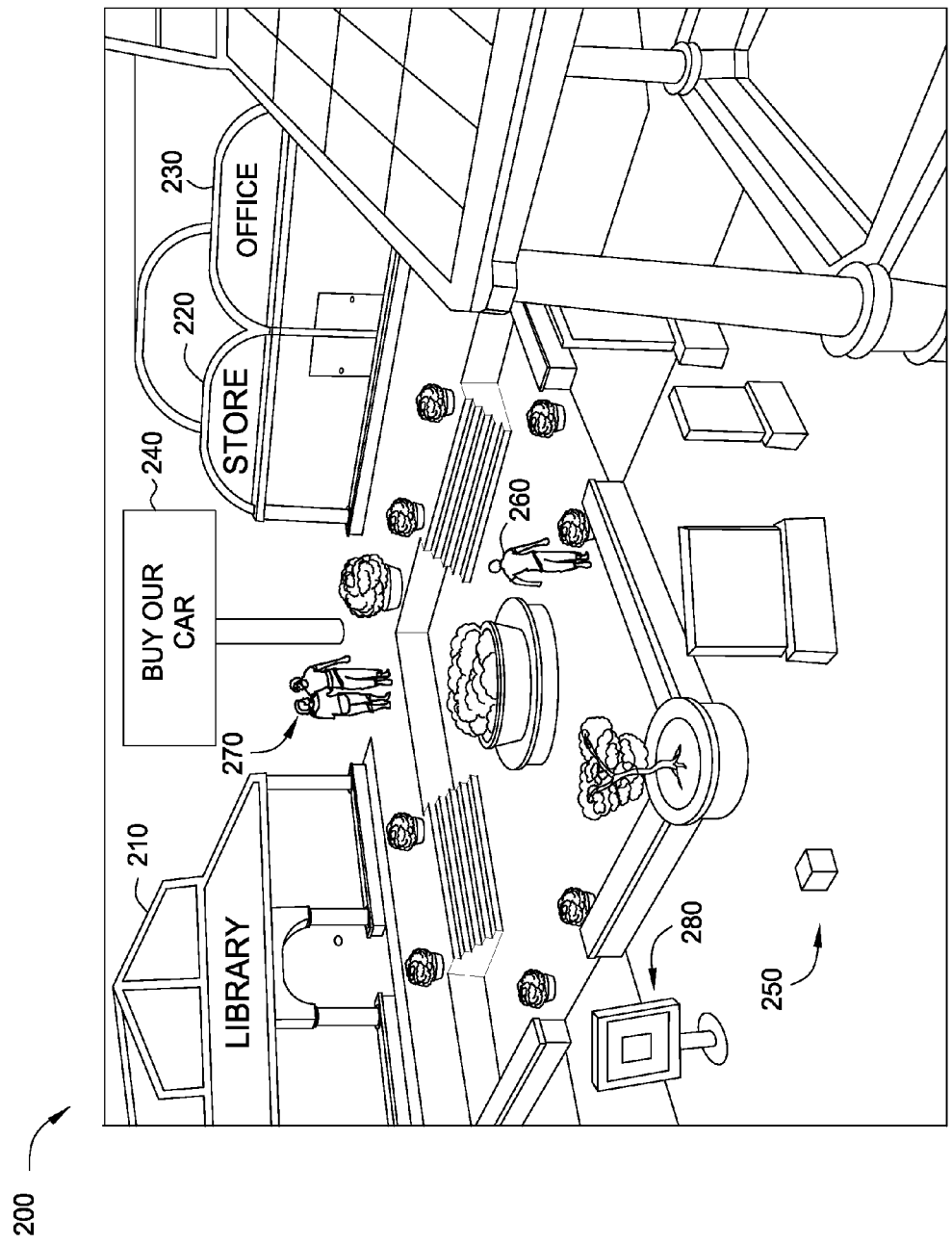
FIG. 2 illustrates an example user display of a user participating in a virtual world, according to one embodiment of the invention.

For instance, using the example illustrated in FIG. 2, virtual objects 132 may include box 250, store 220, library 210, etc. More specifically, FIG. 2 illustrates a user display 200 for a user participating in a virtual world, according to one embodiment of the invention. In this example, the user is represented by avatar 260, and other users are represented by other avatars 270. The user may interact with elements displayed in user display 200. For example, the user may interact with a box 250 by picking it up, opening it, etc. The user may also interact with a kiosk 280 by operating controls built into the kiosk 280, requesting information, etc. The user may also interact with a billboard 240 by looking at it (i.e., by positioning the line of sight directly towards the billboard 240). Additionally, a user may interact with larger elements of the virtual world. For example, the user may be able to enter a store 220, an office 230, or a library 210. As used herein, the term "virtual objects" refers broadly to such elements of a virtual world (e.g., box 250, store 220, etc.).

The user may view the virtual world using a display device 140, such as an LCD or CRT monitor display, and interact with the client application 109 using input devices 150. Further, in one embodiment, the user may interact with client application 109 and virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within virtual world 130.

Within virtual world 130, avatars can interact with other avatars. For example, a user with avatar A could click on an avatar B to start an instant message conversation with the user associated with avatar B. Additionally, a user may interact with virtual objects 132. As used herein, the term "user interaction" is broadly defined to include any interactions with virtual objects 132 or with other avatars. For example, the user may click on a building within the virtual world labeled as a store (e.g., store 220 shown in FIG. 2). In response, the client application 109 could cause the avatar representing the user to walk to the store, enter a lobby area and present the user with the interior of the store, including a virtual salesmen avatar, virtual products, and other avatars present in the store within virtual world 130. The user may then further interact with virtual objects 132 inside the store, for instance looking at a virtual product, picking it up, and purchasing it. The product may represent items used within the virtual environment, e.g., clothing worn by the avatar, or virtual real estate within the virtual world 130, but may also represent real-world goods or services purchased from within the virtual world 130.

In one embodiment, client application 109 may also be configured to enable users to compose and perform search queries for virtual objects 132 of virtual world 130. Such search queries may be performed using object index 125 included in storage 124, as well as a user index 105 included in client storage 104. In one embodiment, user index 105 may include a plurality of interaction records 106, and may be configured for use in performing searches of virtual objects 132. Each interaction record 106 may include data describing a user interaction with a virtual object 132. The data stored in an interaction record 106 may include any type of descriptive information which may be useful for performing searches of virtual objects 132. For example, such data may include data describing an interaction between a user an element of the virtual world 130 such as:

When in time a user saw an object
Where in the viewport the object was located
How the user interacted with the object (i.e., touched, clicked, threw it, walked into it, etc.)
Who was nearby the object at that time
The surrounding objects at that time
The object's relative distance from the user when it was encountered How long the user was in contact with (or looking at) the object What the user was doing at the time the object was encountered (running, walking, talking, etc)

Of course, what information is stored in an information record 106 may include some or all of this information, depending on the type of interaction and the configuration of a given virtual world 130.

Generally, search queries composed in client application 109 may include attribute conditions and interaction conditions. Attribute conditions may specify inherent attributes of a searched object (e.g., object owner, dimensions, color, type, etc), and may be evaluated using object index 125. Interaction conditions may specify a user's past interactions with the desired object, and may be evaluated with user index 105. For example, assume the following search query has been composed by a user of client application 109:

FIND LARGE RED BOX I OPENED ON MONDAY

In this example, the search query includes attribute conditions for size (LARGE), color (RED), and object type (BOX). In addition, the search query includes interaction conditions, namely an action type condition (OPENED) and a time condition (ON MONDAY). Note that the attribute conditions are generic (i.e., not specific to a particular user), and thus may be specified by any user of the virtual world 130. And further, the attribute conditions could describe many large red boxes present in the virtual world. At the same time, the user is not searching for a generic red box, but for the one the user "opened on Monday." In contrast, the attribute conditions are unique to the user composing the search query. In one embodiment, the action and time conditions are evaluated using the user index 105, which only includes interaction records 106 related to the current user.

In one embodiment, search queries composed in client application 109 may be performed in two stages. In a first stage, the search query may be evaluated using object index 125 alone, resulting in a set of virtual object 132 that match the specified attribute conditions. In a second stage, the results of the first stage may be filtered by evaluating the interaction conditions with the user index 105. Thus, the results of the second stage may be a set of virtual objects that satisfies both the attribute conditions and the interaction conditions. The results of the second stage may be presented to the user, for example in a graphical interface displaying query results.

In another embodiment, a search query composed in client application 109 may not include interaction conditions. In such a case, the second stage of performing a search query may comprise sorting the results of the first stage according to a degree of relevance to the user, which may be determined from the user index 105. In other words, results of the first stage may be sorted using the characteristics of the user's past interaction with each object. For example, a virtual object that the user has devoted a great deal of attention to (e.g., carried, used, operated, looked at closely and for an extend periods of time, etc.) may be determined to have higher relevance than an object which the user looked at briefly while "walking" through a virtual room. Thus, a simplified version of the search above of "Find large red box" may still include the large red box most relevant to the user, based on an evaluation of the interaction records 106 of index 105, even though the simplified query did not specify the interaction conditions. After sorting the results of the first stage, a predetermined number of the "top" results (i.e., those results having the most relevance to the user) may be presented to the user. For example, after the second stage of performing the search query, the user may be presented with the top 100 objects of the search results.

In yet another embodiment, search queries may be performed using a combination of filtering and sorting using the user index 105. That is, the second stage of performing a search query may include filtering according to interaction conditions included in the query, as well as sorting according to relevance according to the user index 105. In yet another embodiment, a user may compose search queries with interaction conditions directed to another user's interactions (e.g., "find box opened by user B."). That is, users may evaluate search queries using the user index 105 of another user. Further, search queries may be evaluated using a combination of multiple user indexes 105.

In yet another embodiment, the user may be able to configure system settings to control how search queries are performed. For example, the user may be able to configure a system setting that specifies the number of results returned by the first and/or second stages. Thus, if the first stage does not result in a minimum number of results, the matching of attribute conditions to object index 125 may be performed more broadly (i.e., matched less exactly), thus returning more results. In another example, a user may be able to configure the relative importance of various interaction data. Thus, a user may be able to specify that the amount of time spent interacting with an object may be a more important factor for sorting results than the relative distance of the user to the object during the interaction.

In yet another embodiment, the two stages described above may be reversed in order. That is, the first stage may include matching objects to the interaction conditions with the user index 105, and the second stage may include filtering the objects according to the specified attribute conditions with the object index 125. For example, using the example search query described above, the first stage may identify all objects opened by the user on Monday, and the second stage may filter the identified objects by matching the attributes LARGE, RED, and BOX in the object index. In yet another embodiment, user index 105 and object index 125 may be tables of a relational database. In this embodiment, a query may be performed in a single stage. For example, a search query may be a SQL JOIN query, and may be configured to match objects between the two tables in a single stage, using the object identifier in the user index as a foreign key to the object identifier in the object index.

Of course, the embodiments described above are intended to be illustrative, and are not limiting of the invention. Other embodiments are broadly contemplated. For example, user index 105 may be stored on server 120, rather than on client computer 110. In another example, the search functionality of client application 109 may be incorporated into a server-side application, such as an application hosting the virtual world 130, or in a separate application (e.g., a web browser). In yet another example, object index 125 and user index 105 may be combined in a single data structure. In yet another example, object index 125 and user index 105 may store data describing other users (i.e., avatars) of virtual world 130.

Figure 3:
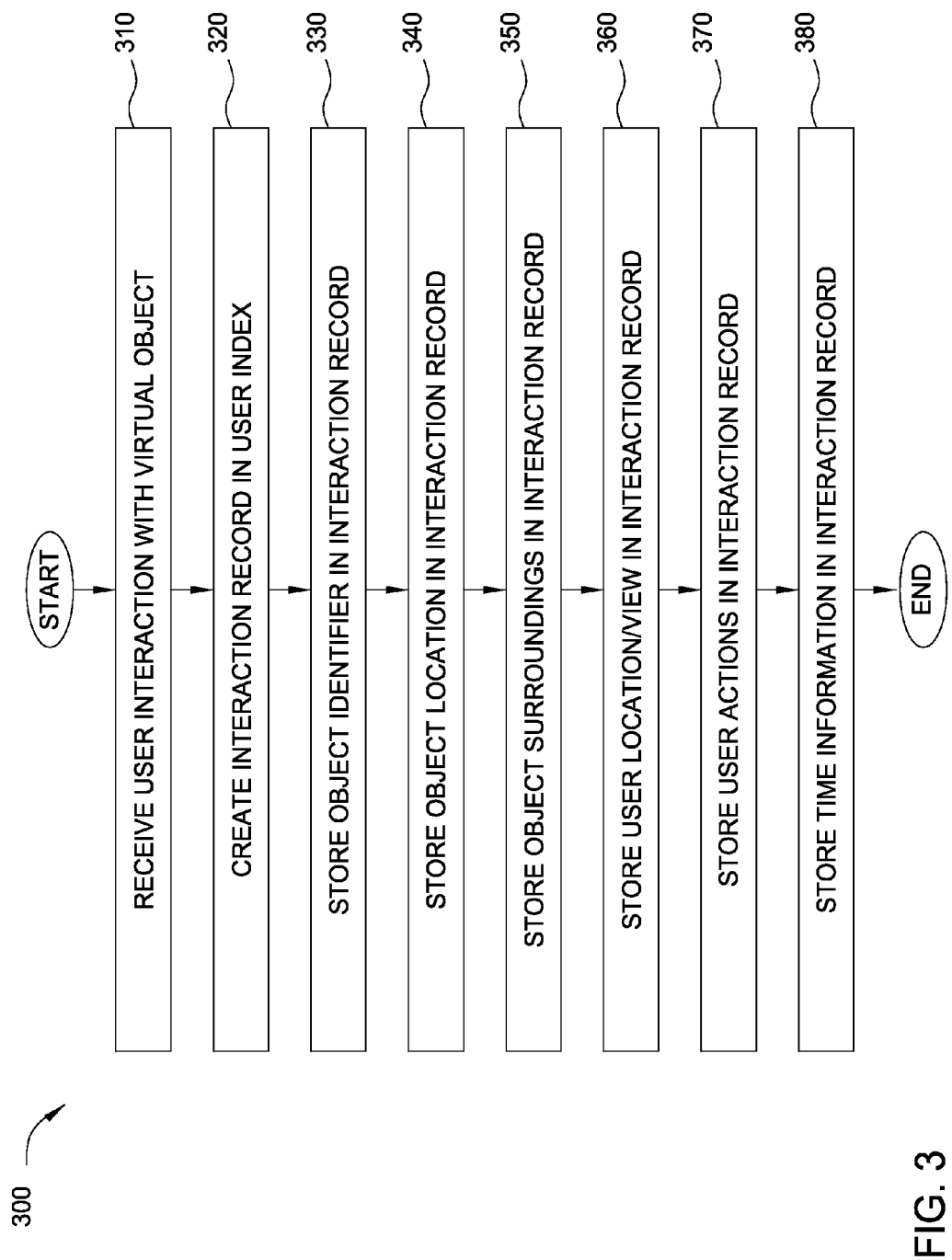
FIG. 3 is a flow diagram illustrating a method for generating a user index configured for searching virtual objects based on user interactions, according to one embodiment of the invention.

FIG. 3 is a flow diagram illustrating a method 300 for generating a user index configured for searching virtual objects based on user interactions, according to one embodiment of the invention. Persons skilled in the art will understand that, even though the method is described in conjunction with the systems of FIGS. 1-2, any system configured to perform the steps of method 300, in any order, is within the scope of the present invention.

As shown, method 300 begins at step 310 where a virtual world receives a user interaction with a virtual object (e.g., a user interacts with kiosk 280 as shown in FIG. 2). At step 320, an interaction record may be created in a user index (e.g., interaction record 106 may be added to user index 105 illustrated in FIG. 1). At step 330, an object identifier may be stored in the interaction record. For example, the object identifier may be an object name, an alphanumeric code, etc. At step 340, data describing the object's location may be stored in the interaction record. Such location data may include, e.g., the object's location coordinates, the object's distance to the user when the interaction place, the object's position relative to other objects in the virtual world 130, etc. This data may be matched to search queries, for example "Find box in town square."

At step 350, data describing the object's surroundings may be stored in the interaction record. Such surroundings data may include other people or objects that were close to the object at the time of the interaction (e.g., to facilitate searches such as "box next to kiosk," "box I saw next to user B," etc.). At step 360, data describing the user's location and view may be stored in the interaction record. Such location data may include, e.g., the user's location coordinates, the user's position relative to known landmarks, the object's position in the user's view of the virtual world, etc.

At step 370, data describing the user's actions may be stored in the interaction record. Such actions data may include the user's interaction with the object (e.g., "looked at box," "picked up box," etc.). Further, the actions data may include degree of the interaction (e.g., "operated all controls on kiosk," "glanced at billboard," etc.). Furthermore, the actions data may include the user's other activities (i.e., other than the interaction itself) at the time of interaction (e.g., "read billboard while walking," etc.). At step 380, data describing time characteristics of the interaction may be stored in the interaction record. Such time data may include the date and time of the interaction, the duration of the interaction, and the like (e.g., "interacted with kiosk at 5 PM on May 13, 2007," "picked up box for five minutes," etc.). After step 380, the method 300 terminates. Of course, method 300 is provided for illustrative purposes only, and is not limiting of the invention. It is contemplated that the steps of method 300 may be modified to incorporate other data describing user interactions into the user index. Such modifications may be made to suit particular situations, and are thus contemplated to be in the scope of the invention.

Figure 4:
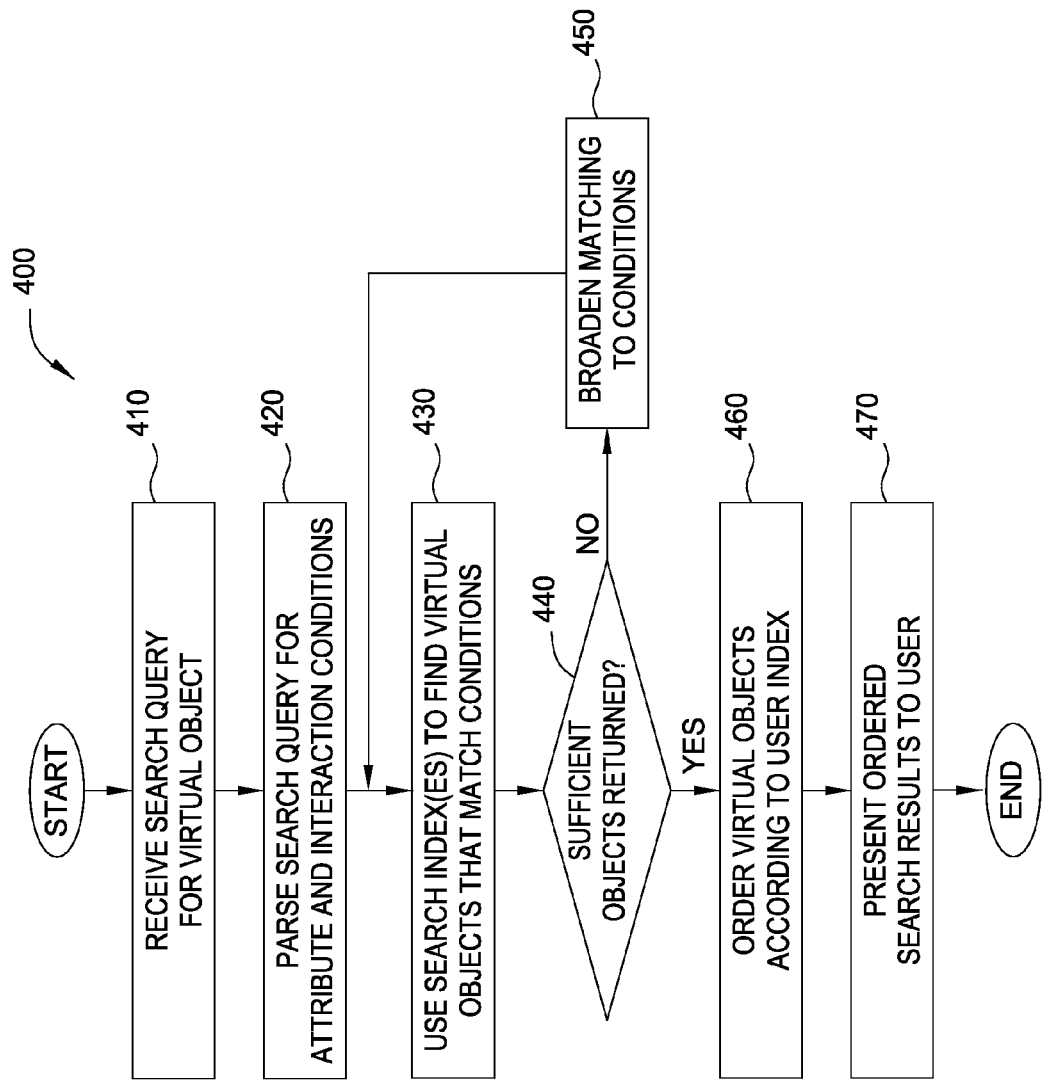
FIG. 4 is a flow diagram illustrating a method for performing a search of objects of a virtual world based on user interactions, according to one embodiment of the invention.

FIG. 4 is a flow diagram illustrating a method 400 for performing a search of objects of a virtual world based on user interactions, according to one embodiment of the invention. Persons skilled in the art will understand that, even though the method is described in conjunction with the systems of FIGS. 1-2, any system configured to perform the steps of method 400, in any order, is within the scope of the present invention.

The method 400 begins at step 410 by receiving a search query for objects of a virtual world. For example, a user may interact with client application 109 to compose a search query for virtual objects 132. At step 420, the search query may be parsed for attribute and interaction conditions. That is, any attribute conditions (i.e., conditions for the inherent properties of the object) included in the search query may be identified. Additionally, the search query may also be parsed for interaction conditions (i.e., conditions dependent upon the user's interactions with the object).

At step 430, an object index (e.g., object index 125 illustrated in FIG. 1) may be used to identify virtual objects that match the attribute conditions included in the search query. Also, if the search query includes one or more interaction conditions, a user index (e.g., user index 105) may be used to identify virtual objects that match the interaction conditions. At step 440, it may be determined whether a sufficient number of objects matching the attribute conditions are returned at step 430. That is, whether the objects matching the attribute conditions of the search query exceed a minimum number of objects specified by a user to define a satisfactory result. If not, the method 400 continues at step 450, where matching of the attribute conditions to the object index may be broadened (i.e., interpreted more loosely, or disregarded altogether). The method 400 then returns to step 430, where the search engine performs a broader search for objects matching the attribute conditions. Otherwise, if there are a sufficient number of objects matching the attribute conditions, the method 400 continues at step 460. At step 460, the objects returned at step 430 may be ordered according to a user index (e.g., user index 105). That is, the objects matching the search query are sorted by relevance to the user by using the user index. At step 460, the ordered search results may be presented to the user. For example, the ordered search results may be presented in a user interface of client application 109. After step 460, the method 400 terminates.

Advantageously, as described above, embodiments of the invention provide a method of search indexing and retrieval of objects in a virtual world that accommodates each user's unique interactions and experiences within the virtual world. Thus, a search engine feature included with the virtual world software may provide users personalized and accurate search results. In particular, in one embodiment, a distributed search index in which the inherent characteristics of each object is indexed on a central server associated with the virtual world, while unique interactions with that object are sub-indexed on the user's local disk or a partition dedicated to that user. Of course, in other embodiments, the location of the indexes may vary. When a user submits a search request, the objects in the central index are combined with the unique interaction data contained in the user specific index to refine search results. By utilizing this method, a person in a virtual world may find relevant information in a constantly changing environment.

While the foregoing is directed to embodiments of the present invention, other and further embodiments of the invention may be devised without departing from the basic scope thereof, and the scope thereof is determined by the claims that follow.

What is claimed is:

1. A computer-implemented method for responding to a search request for non-avatar virtual objects present in an immersive virtual environment, comprising:
   receiving, from a user, a search query for non-avatar virtual objects of the virtual environment, wherein the search query includes one or more attribute conditions identifying characteristics of at least one non-avatar virtual object of the virtual environment, and wherein the search query includes at least one interaction condition describing the user's past interaction with non-avatar virtual objects of the virtual environment;
   determining a collection of non-avatar virtual objects present in the virtual environment satisfying the one or more attribute conditions of the search query;
   filtering the collection of non-avatar virtual objects, based on the one or more interaction conditions, to produce a set of search results responsive to the search query; and
   returning the set of search results to the user.

2. The method of claim 1, wherein the collection of virtual objects is filtered to include virtual objects with which a user avatar has interacted while interacting with the virtual environment.

3. The method of claim 1, further comprising, prior to returning the set of search results to the user, ordering the search results based on the one or more interaction conditions.

4. The method of claim 1, wherein the interaction condition specifies when in time the user saw a given virtual object while interacting with the virtual environment.

5. The method of claim 1, wherein the interaction condition specifies at least one of a location of a user avatar and a location of a specified virtual object within the virtual environment at a time the user avatar interacted with the specified virtual object.

6. The method of claim 1, wherein the interaction condition specifies an action a user avatar performed with a given virtual object present in the virtual environment.

7. The method of claim 6, wherein the action performed with the given virtual object is selected from at least one of a user avatar touching the given virtual object, the user clicking on the virtual object with a mouse cursor, and a length of time the avatar of the user interacted with the virtual object.

8. The method of claim 1, wherein the identifying characteristics of the at least one virtual object includes at least one of an identity of an owner, a time identifying when the virtual object was first created within the virtual environment, an indication of cost for the virtual object, and a type, dimension, color, shape, location, and/or attributes of the virtual object.

9. The method of claim 1, wherein the user's interaction with content elements of the virtual environment is stored in a search index.

10. A computer-readable storage medium including a program, which when executed on a processor performs an operation for responding to a search request for non-avatar virtual objects present in an immersive virtual environment, comprising:
receiving, from a user, a search query for non-avatar virtual objects of the virtual environment, wherein the search query includes one or more attribute conditions identifying characteristics of at least one non-avatar virtual object of the virtual environment, and wherein the search query includes at least one interaction condition describing the user's past interaction with non-avatar virtual objects of the virtual environment;
determining a collection of non-avatar virtual objects present in the virtual environment satisfying the one or more attribute conditions of the search query;
filtering the collection of non-avatar virtual objects, based on the one or more interaction conditions, to produce a set of search results responsive to the search query; and
returning the set of search results to the user.

11. The computer-readable storage medium of claim 10, wherein the collection of virtual objects is filtered to include virtual objects with which a user avatar has interacted while interacting with the virtual environment.

12. The computer-readable storage medium of claim 10, wherein the operation further comprises, prior to returning the set of search results to the user, ordering the search results based on the one or more interaction conditions.

13. The computer-readable storage medium of claim 10, wherein the interaction condition specifies when in time the user saw a given virtual object while interacting with the virtual environment.

14. The computer-readable storage medium of claim 10, wherein the interaction condition specifies at least one of a location of a user avatar and a location of a specified virtual object within the virtual environment at a time the user avatar interacted with the specified virtual object.

15. The computer-readable storage medium of claim 10, wherein the interaction condition specifies an action a user avatar performed with a given virtual object present in the virtual environment.

16. The computer-readable storage medium of claim 15, wherein the action performed with the given virtual object is selected from at least one of a user avatar touching the given virtual object, the user clicking on the virtual object with a mouse cursor, and a length of time the avatar of the user interacted with the virtual object.

17. The computer-readable storage medium of claim 10, wherein the identifying characteristics of the at least one virtual object include at least one of an identity of an owner, a time identifying when the virtual object was first created within the virtual environment, an indication of cost for the virtual object, and a type, dimension, color, shape, location, and/or attributes of the virtual object.

18. A system, comprising:
a processor; and
a memory containing a program, which when executed by the processor is configured to respond to a search request for non-avatar virtual objects present in an immersive virtual environment by performing the steps of:
receiving, from a user, a search query for non-avatar virtual objects of the virtual environment, wherein the search query includes one or more attribute condition describing characteristics of at least one non-avatar virtual object of the virtual environment, and wherein the search query includes at least one interaction condition identifying the user's past interaction with non-avatar virtual objects of the virtual environment;
determining a collection of non-avatar virtual objects present in the virtual environment satisfying the one or more attribute conditions of the search query;
filtering the collection of non-avatar virtual objects, based on the one or more interaction conditions, to produce a set of search results responsive to the search query; and
returning the set of search results to the user.

19. The system of claim 18, wherein the collection of virtual objects is filtered to include virtual objects with which a user avatar has interacted while interacting with the virtual environment.

20. The system of claim 18, further comprising, prior to returning the set of search results to the user, ordering the search results based on the one or more interaction conditions.

21. The system of claim 18, wherein the interaction condition specifies when in time the user saw a given virtual object while interacting with the virtual environment.

22. The system of claim 18, wherein the interaction condition specifies at least one of a location of a user avatar and a location of a specified virtual object within the virtual environment at a time the user avatar interacted with the specified virtual object.

23. The system of claim 18, wherein the interaction condition specifies an action a user avatar performed with a given virtual object present in the virtual environment.

24. The system of claim 23, wherein the action performed with the given virtual object is selected from at least one of a user avatar touching the given virtual object, the user clicking on the virtual object with a mouse cursor, and a length of time the avatar of the user interacted with the virtual object.

25. The system of claim 18, wherein the identifying characteristics of the at least one virtual object include at least one of an identity of an owner, a time identifying when the virtual object was first created within the virtual environment, an indication of cost for the virtual object, and a type, dimension, color, shape, location, and/or attributes of the virtual object.

* * * * *